(12) United States Patent
Cuppett et al.

(10) Patent No.: US 8,975,544 B2
(45) Date of Patent: Mar. 10, 2015

(54) NON-ROTARY, PULL-PULL INTERPHASE GANG-STYLE LINKAGE STRUCTURE FOR HIGH VOLTAGE DEAD TANK BREAKER

(71) Applicant: ABB Technology AG, Zurich (CH)

(72) Inventors: Matthew Cuppett, Uniontown, PA (US); Jonathan Fuge, Farmington, PA (US); Beth Dahm, Pittsburgh, PA (US)

(73) Assignee: ABB Technology AG, Zürich (CH)

( * ) Notice: Subject to any disclaimer, the term of this patent is extended or adjusted under 35 U.S.C. 154(b) by 119 days.

(21) Appl. No.: 13/851,126

(22) Filed: Mar. 27, 2013

(65) Prior Publication Data

US 2013/0270087 A1 Oct. 17, 2013

(51) Int. Cl.
| | |
|---|---|
| *H01H 31/02* | (2006.01) |
| *H01H 31/28* | (2006.01) |
| *H01H 3/46* | (2006.01) |
| *H01H 33/42* | (2006.01) |
| *H02B 13/035* | (2006.01) |

(52) U.S. Cl.
CPC ............. *H01H 31/283* (2013.01); *H01H 3/46* (2013.01); *H01H 33/42* (2013.01); *H02B 13/035* (2013.01)
USPC ....................................................... 200/48 R

(58) Field of Classification Search
CPC ........ H01H 31/283; H01H 33/42; H01H 3/46
USPC ......................................................... 200/48 R
See application file for complete search history.

(56) References Cited

FOREIGN PATENT DOCUMENTS

| JP | S5298162 U | 7/1977 |
| JP | S62 154512 A | 7/1987 |
| JP | H0963423 A | 3/1997 |

OTHER PUBLICATIONS

Royle D J et al. "New 145 kV dead tank spring operated circuit breaker", Trends in Distribution Switchgear, 1994, Fourth International Conference-London, Jan. 1, 1994.
PCT Search Report & Written Opinion in PCT/US2013/033954 dated Jan. 7, 2013.

*Primary Examiner* — Kyung Lee
(74) *Attorney, Agent, or Firm* — Manelli Selter PLLC; Edward J. Stemberger

(57) ABSTRACT

Linkage structure is provided for connection between an operating mechanism and at least one actuating assembly of a circuit breaker for opening and closing a movable electrical contact of a pole assembly associated with the actuating assembly. The linkage structure includes at least one lever constructed and arranged to connect with the at least one actuating assembly. At least one connection rod is coupled to the lever and associated with a close spring for closing the electrical contact. At least one spring structure is coupled to the lever. The spring structure includes at least one open spring providing a spring force on the lever for opening the electrical contact while maintaining the connection rod in tension.

18 Claims, 2 Drawing Sheets

NON-ROTARY, PULL-PULL INTERPHASE GANG-STYLE LINKAGE STRUCTURE FOR HIGH VOLTAGE DEAD TANK BREAKER

FIELD

The invention relates to high voltage, dead tank circuit breakers and, more particularly, to linkage structure for transmitting energy from an operating mechanism simultaneously to poles of the circuit breaker while maintaining the linkage structure in tension.

BACKGROUND

Circuit breakers are commonly found in substations and are operable to selectively open and close electrical connections. Typical dead tank circuit breakers have pole assemblies that include first and second electrical conductors in associated bushings. As is known in the art, electrical power lines are coupled to first and second electrical conductors, and the circuit breaker selectively opens or closes the electrical connection there-between. A bell crank or other actuating assembly is associated with a respective pole assembly. The bell cranks are interconnected by a gang-style rotary or push-pull linkage so that all three poles assemblies are actuated at the same time by a single operating mechanism.

As voltage ratings for three pole operated, dead tank circuit breakers become larger, the pole spread gets larger. As a result, conventional rotary or push-pull inter-phase linkage introduce lag into the breaker operation. To prevent lag, the linkage must be made larger, increasing weight and the energy required of the operating mechanism. In push-pull configurations, the rod of the linkage must stand up to compression over a long time span, which can lead to buckling.

Thus, there is a need to provide circuit breaker linkage structure that uses a pull-pull configuration where the inter-phase connection rods are always in tension.

SUMMARY

An object of the invention is to fulfill the need referred to above. In accordance with the principles of the present invention, this objective is obtained by providing linkage structure for connection between an operating mechanism and at least one actuating assembly of a circuit breaker for opening and closing a movable electrical contact of a pole assembly associated with the actuating assembly. The linkage structure includes at least one lever constructed and arranged to connect with the at least one actuating assembly. At least one connection rod is coupled to the lever and is associated with a close spring for closing the electrical contact. At least one spring structure is coupled to the lever. The spring structure includes at least one open spring providing a spring force on the lever for opening the electrical contact while maintaining the connection rod in tension.

In accordance with another aspect of the disclosed embodiment, a method is provided for maintaining pretension on linkage structure connected between an operating mechanism and at least one actuating assembly of a circuit breaker. The method couples at least one lever with the at least one actuating assembly for opening and closing a movable electrical contact of a pole assembly associated with the actuating assembly. At least one connection rod is coupled to the lever. The connection rod is associated with a close spring for closing the electrical contact. At least one spring structure is coupled to the lever. The spring structure includes at least one open spring providing a spring force on the lever for opening the electrical contact while maintaining the connection rod in tension.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
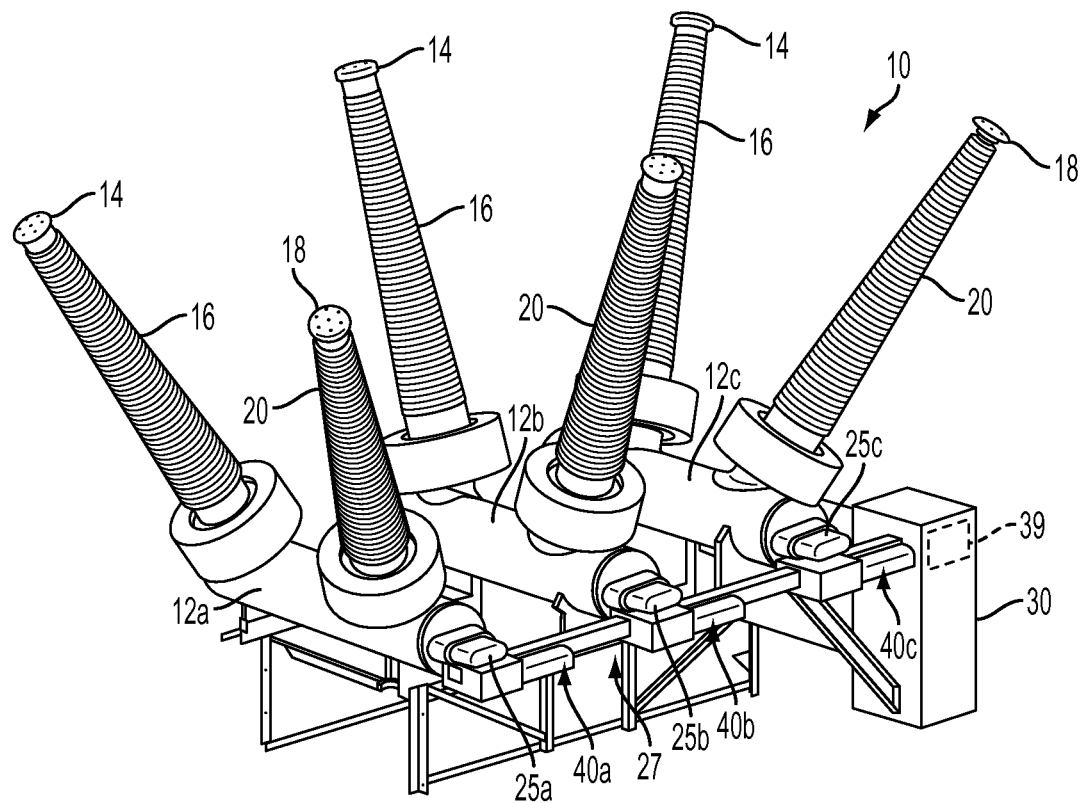
FIG. 1 is a front view of a high voltage, three pole operated dead tank circuit breaker having an interphase linkage structure in accordance with an embodiment.

With reference to FIG. 1, a circuit breaker is shown, generally indicated at 10. Circuit breaker 10 is preferably a three phase circuit breaker and thus includes three pole assemblies 12a, 12b and 12c. Each pole assembly 12 includes a first electrical conductor 14 carried in a first bushing 16 and a second electrical conductor 18 carried in a second bushing 20. Electrical power lines are coupled to the first and second electrical conductors 14 and 18, and the circuit breaker 10 selectively opens or closes the electrical connection there-between.

Figure 2:
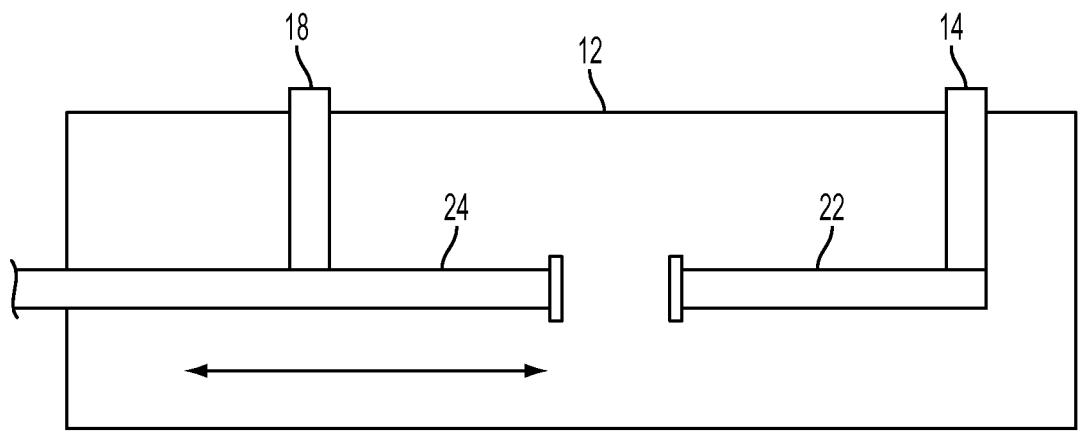
FIG. 2 is a schematic view of an interior of a breaker pole of the circuit breaker of FIG. 1, wherein the electrical contacts are open.

With reference to FIG. 2, a simplified view of an interior of pole assembly 12 is shown, wherein first electrical conductor 14 is electrically connected to a stationary contact 22 which is immovably secured within pole assembly 12. Second electrical conductor 18 is electrically connected to a movable contact 24 which is carried within pole assembly 12 in a manner allowing longitudinal movement therein. Thus, in a first position, the movable contact 24 may be positioned to break the electrical connection between first the electrical conductor 14 and second electrical conductor 18 (FIG. 2). In a second position, the movable contact 24 may be brought into contact with stationary contact 22 to electrically connect the first electrical conductor 14 and the second electrical conductor 18. The interior space of pole assemblies 12 are sealed and generally adapted to minimize arcing between stationary contact 22 and movable contact 24. The interior volume of pole assembly 12 may be filled with dielectric mediums that include $SF_6$, dry air, dry nitrogen, $CO_2$ or oil. Alternatively, a vacuum-type interrupter could be employed within the tank volume surrounded by dielectric mediums mentioned.

Figure 3:
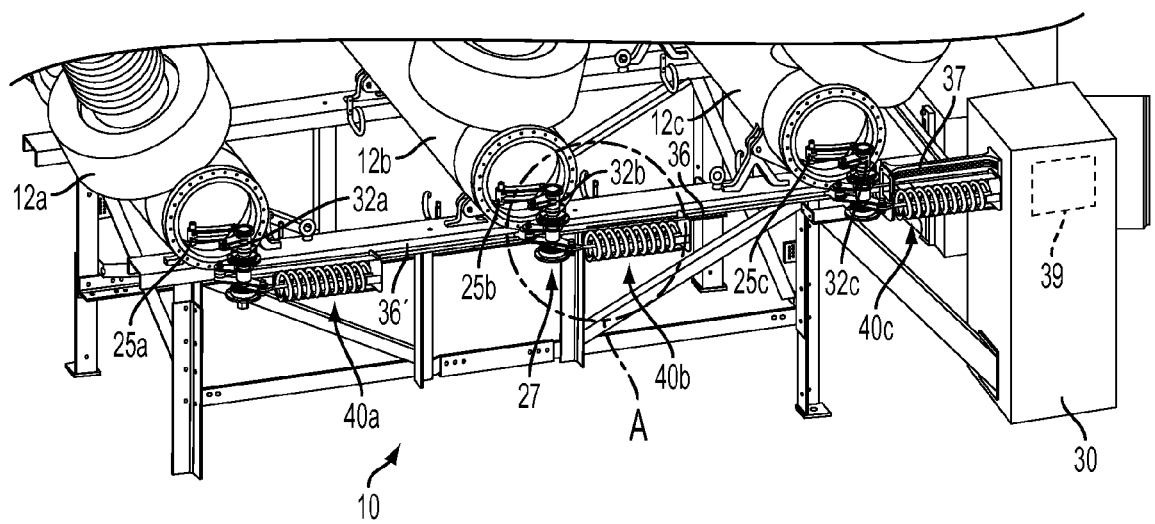
FIG. 3 is a side view of the linkage structure of the circuit breaker of FIG. 2 with housings removed.

With reference to FIG. 3, an actuating assembly, preferably in the form of a bell crank assembly 25a, 25b, 25c, is coupled with the movable electrical contact 24 of a respective pole assembly 12a, 12b and 12c for opening and closing the electrical connection between conductors 14 and 18. The bell crank assemblies are conventional and can be of the type disclosed in U.S. Patent Application Publication No. 20100270136A1, the content of which is hereby incorporated by reference into this specification. The bell crank assemblies are interconnected by a gang-style, non-rotary, pull-pull linkage structure, generally indicated at 27, so that all three poles assemblies are actuated at the same time by a single, electrically controlled operating mechanism 30.

Figure 4:
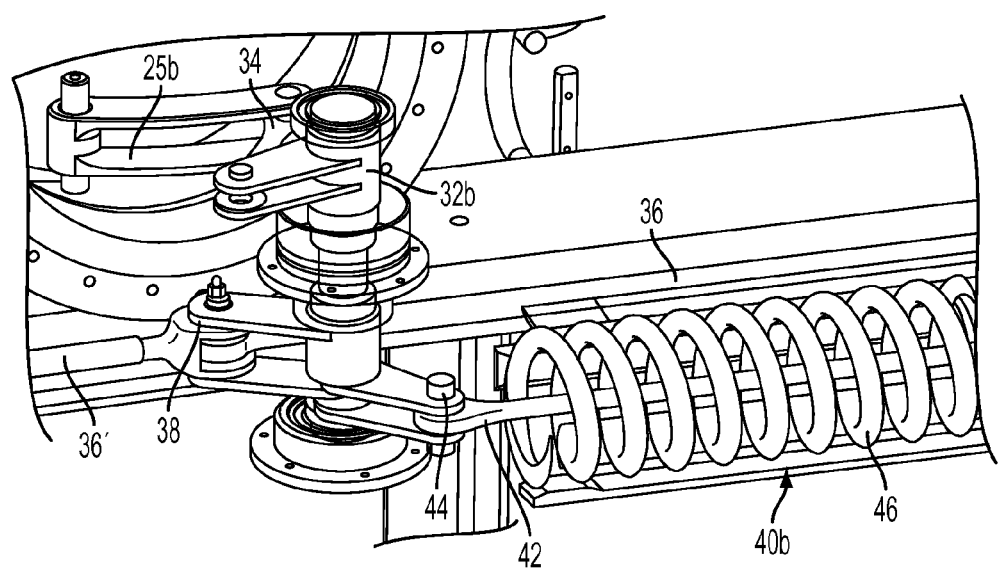
FIG. 4 is an enlarged side view of the portion of the linkage structure encircled at A in FIG. 3, showing a lever, an open spring, and interphase connection rods.

With reference to FIG. 3, the linkage structure 27 includes a lever 32a, 32b and 32c coupled with a respective bell crank assembly 25a, 25b and 25c for opening and closing the electrical connection at the associated pole assembly (e.g., 12b). In particular and as best shown in FIG. 4, each lever (e.g., lever 32b) is coupled via a crank link 34 with the associated bell crank assembly (e.g., bell crank assembly 25b). An interphase connecting rod 36 is coupled to the lever 32b at pin connection 38. The other end (not shown in FIG. 4) of the connection rod 36 is coupled lever 32c. Connection rod 36' is coupled between levers 32b and 32a. Thus, for three pole circuit breaker, three levers 32a, 32b and 32c are provided, interconnected by two connection rods 36 and 36'. Rod 37 (FIG. 1) is coupled to lever 32c and to a close spring 39 in the operating mechanism 29 for closing the circuit breaker 10. Since the levers 32a, 32b and 32c are interconnected via the connection rods 36, 36' and rod 37, the levers move simultaneously upon actuating of the mechanism 30 to operate the bell crank assemblies simultaneously.

As shown in FIGS. 3 and 4, an open spring structure 40a, 40b and 40c is coupled to a respective lever 32a, 32b and 32c. For example, an end of link 42 of the spring structure 40 is coupled by a pin connection 44 to the lever 32b. The other end of the link 42 is coupled to an end of an open coil spring 46. The open springs 46 provide the force opposing the close spring 39 for opening electrical the electrical conductors 14, 18 of the circuit breaker 10. Spring 46 of the spring structure 40 also provides a spring force on the associated lever 32 and thus maintains the connecting rods 36, 36' in tension. In the embodiment, three spring structures 40 are provided, one for each pole assembly 12 with the total spring force of the open springs 46 opposing the spring force of the close spring 39. However, instead of providing three separate open springs 46, a single open spring 46 can be provided, for example, at only pole assembly 12a that opposes the force of the close spring 39.

Since the connection rods 36, 36 are always in tension, the size thereof can be is minimized since buckling and torsion are not present. The pull-pull configuration as compared to the rotary and push-pull systems requires the smallest interphase connection rods, which ensures a compact configuration requiring less energy for operation, reduces shipping weight of the breaker 10, and reduces lag time.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Linkage structure for connection between an operating mechanism and at least one actuating assembly of a circuit breaker for opening and closing a movable electrical contact of a pole assembly associated with the actuating assembly, the linkage structure comprising:
    at least one lever constructed and arranged to connect with the at least one actuating assembly,
    at least one connection rod coupled to the lever and associated with a close spring for closing the electrical contact, and
    at least one spring structure coupled to the lever, the spring structure including at least one open spring providing a spring force on the lever for opening the electrical contact while always maintaining the connection rod in tension.

2. The linkage structure of claim 1, wherein the open spring is a coil spring.

3. The linkage structure of claim 2, wherein the spring structure includes a link having one end coupled to an end of the open spring and another end coupled to the lever.

4. The linkage structure of claim 3, further comprising a pin coupling the link to the lever.

5. The linkage structure of claim 1, in combination with the operating mechanism and the actuating assembly.

6. The combination of claim 5, wherein the actuating assembly comprises at least one bell crank assembly coupled to the lever.

7. The combination of claim 6, wherein the circuit breaker is a high voltage, dead tank circuit breaker having three pole assemblies and a bell crank assembly coupled with the movable electrical contact of each pole assembly, wherein
    a lever is coupled with each bell crank assembly,
    two connection rods interconnect the levers, and
    a rod is coupled between one of the levers and the close spring so that the bell cranks can be operated simultaneously to close the movable electrical contact of each pole assembly.

8. The combination of claim 7, wherein a spring structure is provided at each pole assembly, a link of each spring structure has one end coupled to an end of an associated open spring and with another end coupled to the associated lever.

9. The combination of claim 8, wherein the open springs are constructed and arranged such that a total spring force of the open springs opposes a spring force of the close spring.

10. The combination of claim 9, wherein the open springs are constructed and arranged to cause the levers and thus the bell crank assemblies to move simultaneously to open the movable electrical contact of each pole assembly.

11. The combination of claim 7, wherein each connection rod is coupled to an associated lever by a pin connection.

12. A method of maintaining pretension on linkage structure connected between an operating mechanism and at least one actuating assembly of a circuit breaker, the method including the steps of:
    coupling at least one lever with the at least one actuating assembly for opening and closing a movable electrical contact of a pole assembly associated with the actuating assembly,
    coupling at least one connection rod to the lever,
    associating the connection rod with a close spring for closing the electrical contact, and
    coupling at least one spring structure to the lever, the spring structure including at least one open spring providing a spring force on the lever for opening the electrical contact while always maintaining the connection rod in tension.

13. The method of claim 12, wherein the actuating assembly is a bell crank assembly and the lever is coupled to the bell crank assembly via crank link.

14. The method of claim 12, wherein the open spring is a coil spring and wherein the spring structure includes a link having one end coupled to an end of the open coil spring and another end coupled to the lever.

15. The method of claim 13, wherein the circuit breaker is a high voltage, dead tank circuit breaker having three pole assemblies and a bell crank assembly coupled with the movable electrical contact of each pole assembly, wherein a lever is coupled with each bell crank assembly, the method further comprising:

interconnecting the levers by two connection rods, and coupling a rod between one of the levers and the close spring so that the bell cranks can be operated simultaneously to close the movable electrical contact of each pole assembly.

16. The method of claim 15, wherein a spring structure is provided at each pole assembly, with each spring structure providing one open spring, the method including:

coupling an end of a link of each spring structure to an end of an associated open spring and coupling another end of the link to the associated lever.

17. The method of claim 16, wherein the open springs are provided such that a total spring force of the open springs opposes a spring force of the close spring.

18. The combination of claim 16, wherein the open springs are provided to cause the levers and thus the bell cranks to move simultaneously to open the movable electrical contact of each pole assembly.

\* \* \* \* \*